(12) United States Patent
Simpson

(10) Patent No.: US 7,742,518 B2
(45) Date of Patent: Jun. 22, 2010

(54) DISCRIMINATOR FUNCTION FOR GPS CODE ALIGNMENT

(75) Inventor: Robert G. Simpson, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 955 days.

(21) Appl. No.: 11/287,377

(22) Filed: Nov. 28, 2005

(65) Prior Publication Data
US 2007/0121708 A1    May 31, 2007

(51) Int. Cl.
H04B 1/00    (2006.01)

(52) U.S. Cl. .................. 375/149; 375/139; 375/343; 375/147; 375/140; 375/150

(58) Field of Classification Search .......... 375/149, 375/147, 140, 343, 150; 370/319, 320, 321; 342/150, 151, 152, 153, 154, 155; 333/193, 333/194
See application file for complete search history.

(56) References Cited

U.S. PATENT DOCUMENTS

| | | |
|---|---|---|
| 4,698,672 A | 10/1987 | Chen et al. |
| 5,995,044 A | 11/1999 | Kunysz et al. |
| 6,201,828 B1 * | 3/2001 | El-Tarhuni et al. .......... 375/150 |
| 6,456,648 B1 * | 9/2002 | Bultan et al. ................ 375/148 |
| 6,614,834 B1 * | 9/2003 | Meng et al. .................. 375/149 |
| 7,142,589 B2 * | 11/2006 | Valio .......................... 375/150 |
| 2002/0101912 A1 | 8/2002 | Phelts et al. |

FOREIGN PATENT DOCUMENTS

EP    1598677    11/2005

OTHER PUBLICATIONS

Kaplan et al., "Understanding GPS: Principles and Applications", 1996, pp. 142-150.
Van Dierendonck et al., "Theory and Performance of Narrow Correlator Spacing in a GPS Receiver", "Navigation: Journal of the Institute of Navigation", Oct. 1992, pp. 265-283, vol. 39, No. 3, Publisher: Institute of Navigation, Published in: US.

* cited by examiner

*Primary Examiner*—Shuwang Liu
*Assistant Examiner*—Helene Tayong
(74) *Attorney, Agent, or Firm*—Fogg & Powers LLC

(57) ABSTRACT

Embodiments of the present invention pertain generally to methods and systems of processing a global positioning satellite (GPS) signal. More particularly, embodiments of the present invention provide an improved discriminator function that utilizes the early, prompt, and late correlator values. For example, the improved discriminator function may be normalized based on all three of the early, prompt, and late correlator values. The improved discriminator function behaves linearly across a prescribed region whose width depends on the separation between correlators.

18 Claims, 7 Drawing Sheets

DISCRIMINATOR FUNCTION FOR GPS CODE ALIGNMENT

DESCRIPTION OF THE EMBODIMENTS

1. Field of the Invention

The subject matter of this disclosure generally relates to global positioning system (GPS) signals. More particularly, the subject matter of this disclosure pertains to methods and systems that can provide code alignment for GPS signal processing.

2. Background of the Invention

The global positioning system (GPS) may be used for determining the position of a user on or near the earth from signals received from multiple orbiting satellites. The orbits of the GPS satellites are arranged in multiple planes, in order that signals can be received from at least four GPS satellites at any selected point on or near the earth.

Each satellite transmits two spread-spectrum signals in the L band, known as L1 and L2, with separate carrier frequencies. L1 is at a nominal center frequency of 1575.42 MHz and L2 is at a nominal center frequency of 1227.60 MHz. The two signals are used to eliminate errors that may arise due to the dispersion of the transmitted signals by the ionosphere. Each satellite uses at least one of two pseudorandom noise (PRN) codes that are unique to that satellite to modulate its carrier signals. This allows the L-band signals from a number of satellites to be individually identified and separated in a receiver. Each carrier is also modulated by a slower-varying data signal defining the satellite orbits and other system information. One of the PRN codes is referred to as the C/A (coarse/acquisition) code, while the second is known as the P (precise) code.

Two signals are broadcast on the L1 frequency, a coarse/acquisition (C/A) and an encrypted precision ranging P(Y) code. The C/A code is typically delayed by 90 degrees in carrier phase from the P(Y) code. The C/A code is a PRN Gold code of 1023 chips, run at a chipping rate of 1.023 MHz, resulting in a null-to-null bandwidth of 2.046 MHz and a repetition rate of 1 millisecond. One use for the C/A code is that it may be used to synchronize the receiver with the longer P(Y) code, which is generated by the Modulo-2 addition (i.e., a logical Exclusive OR operation) of two code sequences of 15,345,000 chips and 15,345,037 chips, respectively. Different satellites will have different sequences. The resulting P(Y) code has a period of 7 days. At a chipping rate of 10.23 MHz, the P(Y) code has a null-to-null bandwidth of 20.46 MHz. The system broadcasts only the P(Y) code on the L2 frequency.

In the conventional GPS receiver, replicas of the P-code and C/A code may be locally generated in the same manner as in the satellite. The L1 and L2 signals from a given satellite are demodulated by aligning the phases, i.e., by adjusting the timing, of the locally-generated codes with those modulated onto the signals from that satellite. In order to achieve such phase alignment, the locally generated code replicas are correlated with the received signals and the phase of the locally generated code is adjusted to bring the signals into temporal alignment. Each chip in the code in the received signal arrives at a low power that is below the noise level. In order to obtain a detectable signal, the received signal is repeatedly added across all the chips. A starting time of each epoch of the received C/A code may then be determined from this operation. Since the starting time of each transmitted epoch is defined, the time of receipt can be used as a measure of the transit time or range to the satellite. Again, because the C/A and P-codes are unique to each satellite, a specific satellite may be identified based on the results of the correlations between the received signals and the locally-generated C/A and P-code replicas. Therefore, aligning the locally-generated C/A and P-code replicas with those received from the satellite is critical to the operation of a GPS receiver.

In order to align the locally-generated C/A code with the unique C/A code in a satellite's signal, a GPS receiver will use what is known as a discriminator function. A conventional GPS receiver will take the locally-generated C/A code replica (known as the prompt code) and time shift it forward or backward in time by half a chip or less to produce an early code and a late code. The early and late codes are then correlated with the incoming C/A code in the signal from the GPS satellite. This correlation operation produces results that are squared to obtain two correlator powers (Pe and Pl), which are then input into the discriminator function. The discriminator function will compare the two correlator powers and produce an output. The output is used as a control signal in a delay lock loop (DLL) to adjust the rate of the locally generated C/A code to align it with the C/A code of the signal from the GPS satellite.

FIG. 6 illustrates an exemplary output of a typical discriminator. For a typical discriminator, the output is a curve 600 having a central portion 602 that is linear or nearly linear. However, typical discriminators exhibit some form of saturation, which is illustrated by curve 600 having limiting value at its two extremes, as shown by portions 604 and 606.

Two key attributes of a discriminator's output are the slope of curve 600 at the zero crossing 608 and the limiting value as it saturates. The slope at the zero crossing influences the bandwidth of the DLL. Larger slopes mean larger bandwidths. While larger bandwidths allow the DLL to respond more quickly to a misalignment, they also increase the impact of noise on the result. Proper design of the DLL involves a well chosen balance between responsiveness and noise sensitivity. In order to compare different discriminators, it is common practice to normalize their outputs to have the same slope at the zero crossing.

A normalized early-minus-late discriminator function for a discriminator may be calculated as follows:

$$D=\tfrac{1}{2}(1-\Delta)(Pe-Pl)/(Pe+Pl),\ \text{where}$$

D is the discriminator output;

Δ is half the separation between the early and late correlators;

Pe is the correlator power for the early code; and

Pl is the correlator power for the late code.

In FIG. 6, the exemplary output of a typical code discriminator has been calculated, where Δ=half a chip width and the curve has been normalized so that the slope is 1 at the zero crossing 608.

Assuming that two discriminator candidates have both been normalized to have the same slope at the zero crossing, the magnitude of the limiting value at saturation is also of interest. This characteristic affects what is known as the "pull-in" capability of the DLL. The larger the saturation value, the faster the DLL can pull the local C/A code into alignment with the received C/A code during acquisition phase. That means that for two discriminator candidates that have been normalized to have the same slope at the zero crossing, the one that produces the greater range of output values is preferable from an overall performance view.

Accordingly, it would be desirable to provide methods and systems that provide good bandwidth and pull-in performance. It would also be desirable to provide improved discriminator methods and systems.

SUMMARY OF THE INVENTION

In accordance with one feature of the present invention, a method of aligning a local code with a code in a received signal comprises: generating a prompt replica of the local code; generating a late replica of the local code and an early replica of the local code based on shifting the prompt replica by half of a chip at most; correlating the early, prompt, and late replicas of the local code with the received signal; determining an early correlator power, a prompt correlator power, and a late correlator power based on the correlations of the replicas of the local code with the received signal; calculating a discrimination output in which the normalization relies not only on the early correlator power and the late correlator power, but also the prompt correlator power; and adjusting a rate of the local code based on the discrimination output.

In accordance with another feature of the present invention, an apparatus for aligning a local code with a code in a received signal comprises: means for generating a prompt replica of the local code; means for generating a late replica of the local code and an early replica of the local code based on shifting the prompt replica by half of a chip at most in opposite directions; means for correlating the early, prompt, and late replicas of the local code with the received signal; means for determining an early correlator power, a prompt correlator power, and a late correlator power based on the correlations of the replicas of the local code with the received signal; means for calculating a discrimination output based not only on the early correlator power and the late correlator power, but also the prompt correlator power; and means for adjusting a rate of the local code based on the discrimination output.

In accordance with another feature of the present invention, a delay lock loop is configured to track a pseudo random noise code in a received signal. The delay lock loop comprises: a code generator that generates a prompt replica of the local code, a late replica of the local code and an early replica of the local code based on shifting the prompt replica by half of a chip at most; a demodulator configured to correlate the early, prompt, and late replicas of the local code with the received signal; a processor configured to calculate an early correlator power, a prompt correlator power, and a late correlator power based on the correlations of the replicas of the local code with the received signal; a code discriminator configured to calculate a properly normalized discrimination output based on the early correlator power, the prompt correlator power, and the late correlator power; and a feedback module configured to provide a signal that indicates an adjustment to a rate of the local code generated by the code generator based on the discrimination output.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Embodiments of the present invention pertain generally to methods and systems of processing a global positioning satellite (GPS) signal. More particularly, embodiments of the present invention provide an improved discriminator function that utilizes the early, prompt, and late correlator power values. For example, the improved discriminator function may be normalized based on all three of the early, prompt, and late correlator values. The improved discriminator function behaves linearly across a prescribed region whose width depends on the separation between correlators.

In some embodiments, the separation between correlators may be evenly spaced, such as +/−½ chip. In other embodiments, the separation between correlators may be different to account for multipath signals. For example, the spacing between the prompt and late correlator values may be less than the spacing used for the early and prompt correlator values.

In addition, embodiments of the present invention may perform I and Q processing with IF signals and with signals that arise in baseband systems. Either technique may be used in embodiments of the present invention.

Figure 6:
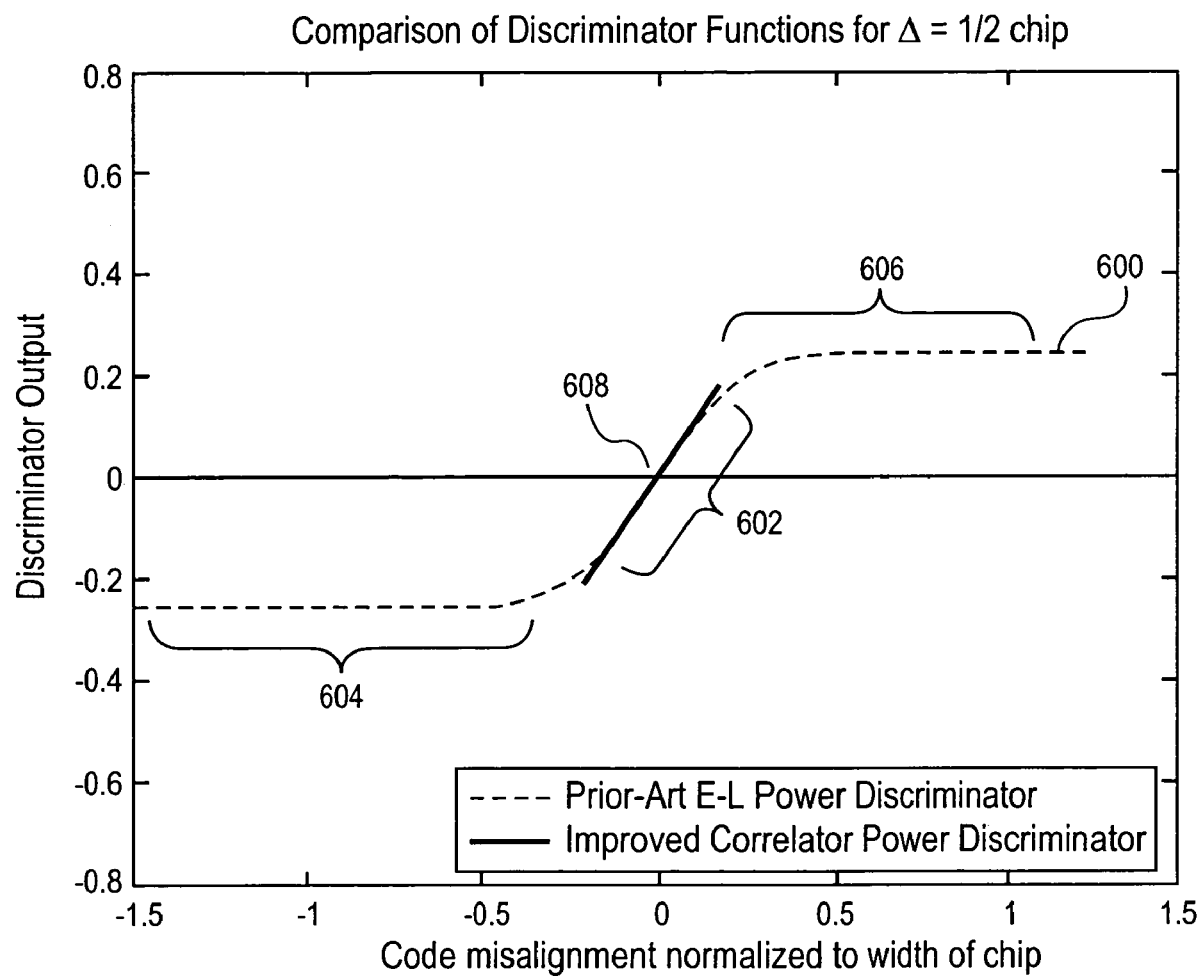
FIG. 6 illustrates an exemplary output of a typical code discriminator.
Figure 7:
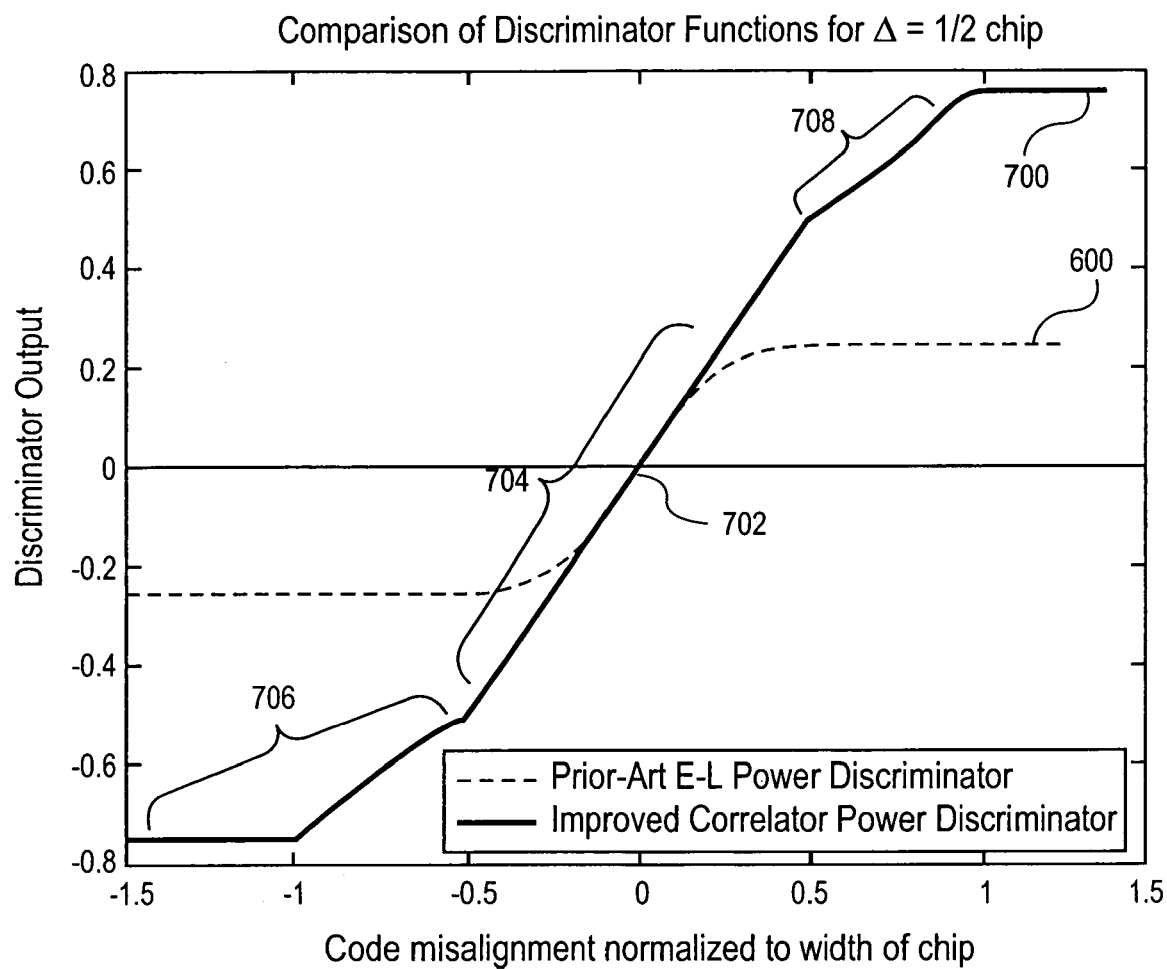
FIG. 7 illustrates exemplary outputs of a typical code discriminator and a discriminator that is in accordance with embodiments of the invention.

FIG. 7 shows a comparison of the normalized outputs for a typical discriminator and a discriminator that is in accordance with embodiments of the invention. In FIG. 7, the output of a typical discriminator is shown again as curve 600, while the output of a discriminator that is in accordance with embodiments of the invention is shown as curve 700. As in FIG. 6, curves 600 and 700 have been calculated where Δ=half a chip width and have been normalized so that the slope is 1 at the zero crossing 702.

However, as will be explained below, discriminators that are in accordance with embodiments of the invention will have a linear portion 704 that extends over a larger range than that of curve 600. In addition, these discriminators may exhibit higher saturation values. For example, as shown, portions 706 and 708 of curve 700 saturate at a higher value than curve 600. Since curves 600 and 700 have the same slope at the zero crossing 702, this implies they are supporting equal DLL bandwidths. However, as explained above, the discriminator of curve 600 will achieve poorer pull-in performance in comparison to the discriminator of curve 700. Or, the discriminator of curve 700 will exhibit better pull-performance than the typical discriminator exemplified by curve 600.

In view of the importance of properly establishing the DLL bandwidth while also achieving good pull-in performance, one skilled in the art will recognize that a discriminator whose output behaves more like curve 700 may perform better than a typical discriminator, such as the one exemplified in curve 600.

Reference will now be made in detail to the present exemplary embodiments of the invention, examples of which are illustrated in the accompanying drawings. Wherever possible, the same reference numbers will be used throughout the drawings to refer to the same or like parts.

Figure 1:
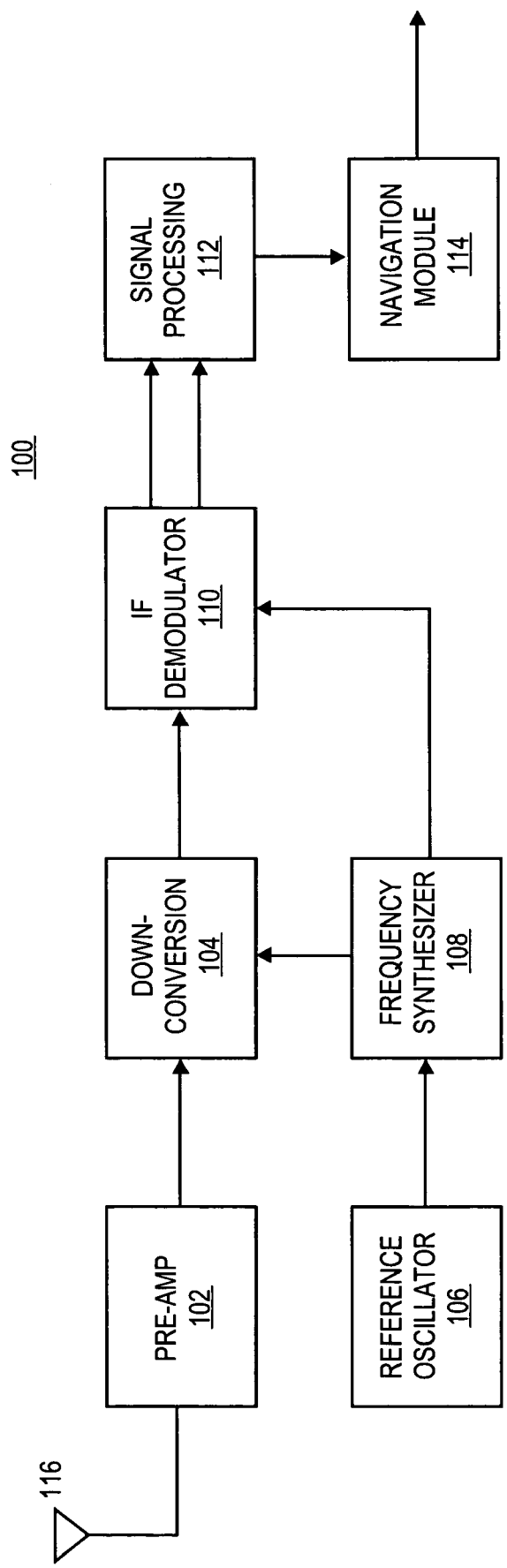
FIG. 1 illustrates a block diagram of a GPS receiver in accordance with an embodiment of the invention.

FIG. 1 illustrates a block diagram of a GPS receiver 100 in accordance with an embodiment of the invention. It should be readily apparent to those of ordinary skill in the art that the block diagram depicted in FIG. 1 represents a generalized schematic illustration and that other components may be added or existing components may be removed or modified. Moreover, the GPS receiver 100 may be implemented using various components. These components may be software components, hardware components, firmware, or any combination thereof.

As shown in FIG. 1, the GPS receiver 100 includes a pre-amp module 102, a down conversion module 104, a reference oscillator module 106, a frequency synthesizer module 108, an intermediate frequency demodulator 110, a signal processing module 112 and a navigation module 114.

A GPS signal may be received at an omni-directional antenna 116 and filtered by the pre-amp module 102. The filtered RF signal is then down-converted by the down conversion module 104.

The down conversion module 104 is driven by a first local oscillator signal $LO_1$ supplied by the frequency synthesizer module 108, which itself is driven by the reference oscillator 106. In addition, the frequency synthesizer 108 provides a second local oscillator signal $LO_2$ and a clock signal to the intermediate frequency (IF) module 110. The IF demodulator 110 may then generate digital in-phase and quadrature (I & Q) channels by multiplication by sine and cosine versions of the second local oscillator signal $LO_2$.

The signal processing module 112 may be configured to include a carrier loop and a code tracking loop (not shown in FIG. 1). The outputs of these loops may include a pseudorange, Doppler, and carrier phase, which are then processed by the navigation processing module 114 to determine the receiver's position, velocity, and time.

Figure 2:
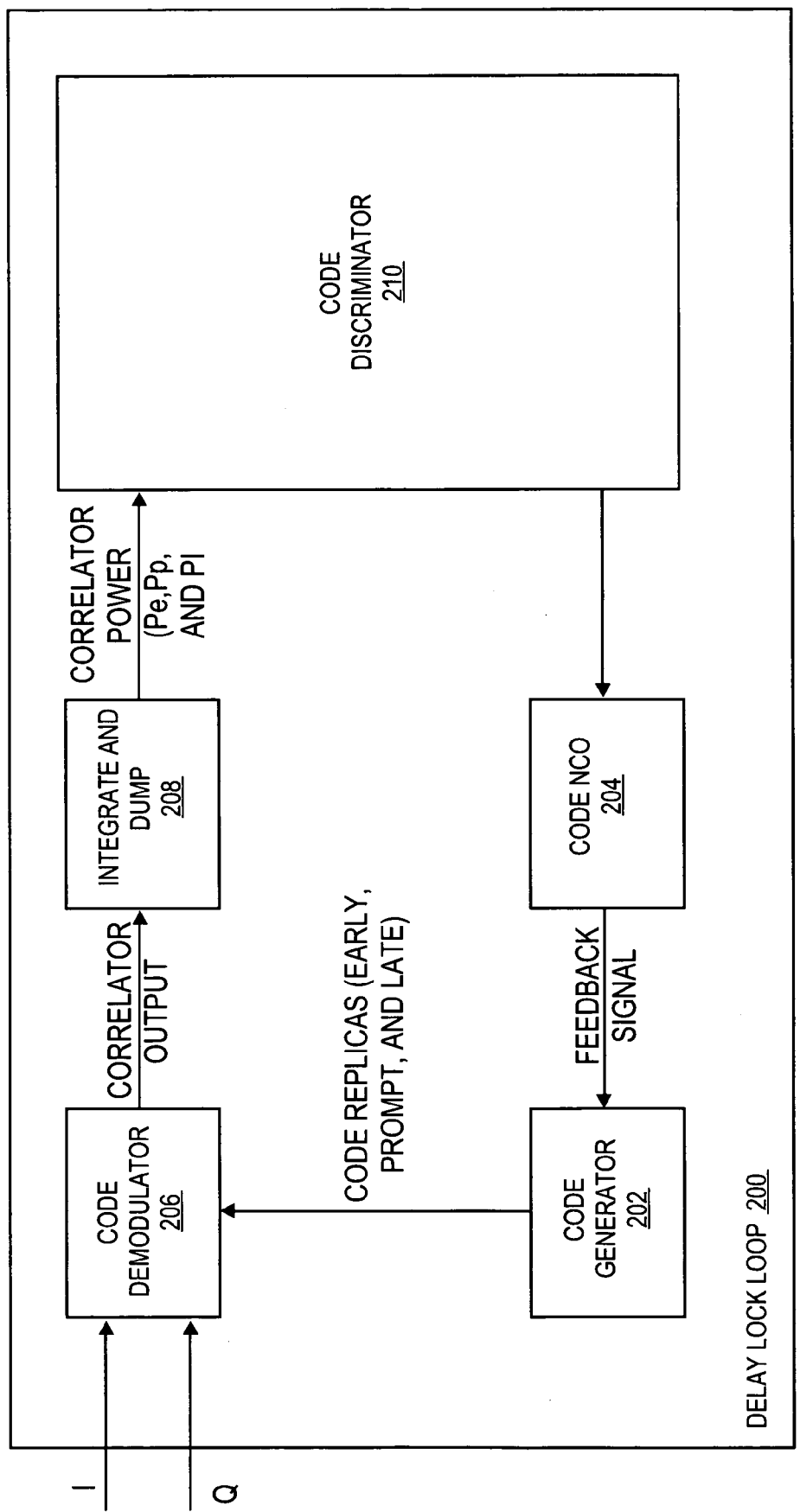
FIG. 2 illustrates a more detailed block diagram of the signal processing module shown in FIG. 1 in accordance with another embodiment of the invention.

FIG. 2 illustrates a more detailed block diagram of the signal processing module 112 shown in FIG. 1 in accordance with another embodiment of the invention. As noted above, in order to track an incoming GPS signal, signal processing module 112 may employ two tracking loops. A delay lock loop (DLL) may be used to track the C/A code and a phase lock loop (PLL) may be used to track the carrier frequency of the incoming GPS signal. FIG. 2 illustrates an exemplary DLL for tracking the C/A code of an incoming GPS signal. As shown, a DLL loop 200 may comprise a code generator 202 and a code numerically controlled oscillator (NCO) 204.

Code generator 202 generates three different phases of local replica codes—Early, Prompt, and Late, which are separated from adjacent neighbors by at most ½ of a chip. The early code is advanced with respect to the prompt code and the late phase is delayed with respect to the prompt code. The three codes are inputted to a code demodulator 206 where they are multiplied with both the in-phase (I) and quadrature (Q) components of the incoming GPS signal. Code demodulator 206 then outputs these correlator values to an integrate and dump module 208.

Integrate and dump module 208 filters and squares the early, prompt, and late correlator values and produces early, prompt, and late correlator power values, Pe, Pp, and Pl. The I and Q channels may be processed side by side and then added to determine the overall correlator power data. The correlator power values are then provided to code discriminator 210.

Code discriminator 210 calculates an output by comparing the correlator power values. The output is then fed back to code NCO 204 to generate a feedback signal to code generator 202. Code generator 202 may then adjust its rate based on the feedback signal.

In some embodiments, code discriminator 210 calculates its output based on all three correlator powers, Pe, Pp, and Pl. One skilled in the art will recognize that this is unlike conventional discriminators, which use only early and late correlator powers. The following discussion briefly describes how all three correlator powers may be used by code discriminator 210.

Figure 3:
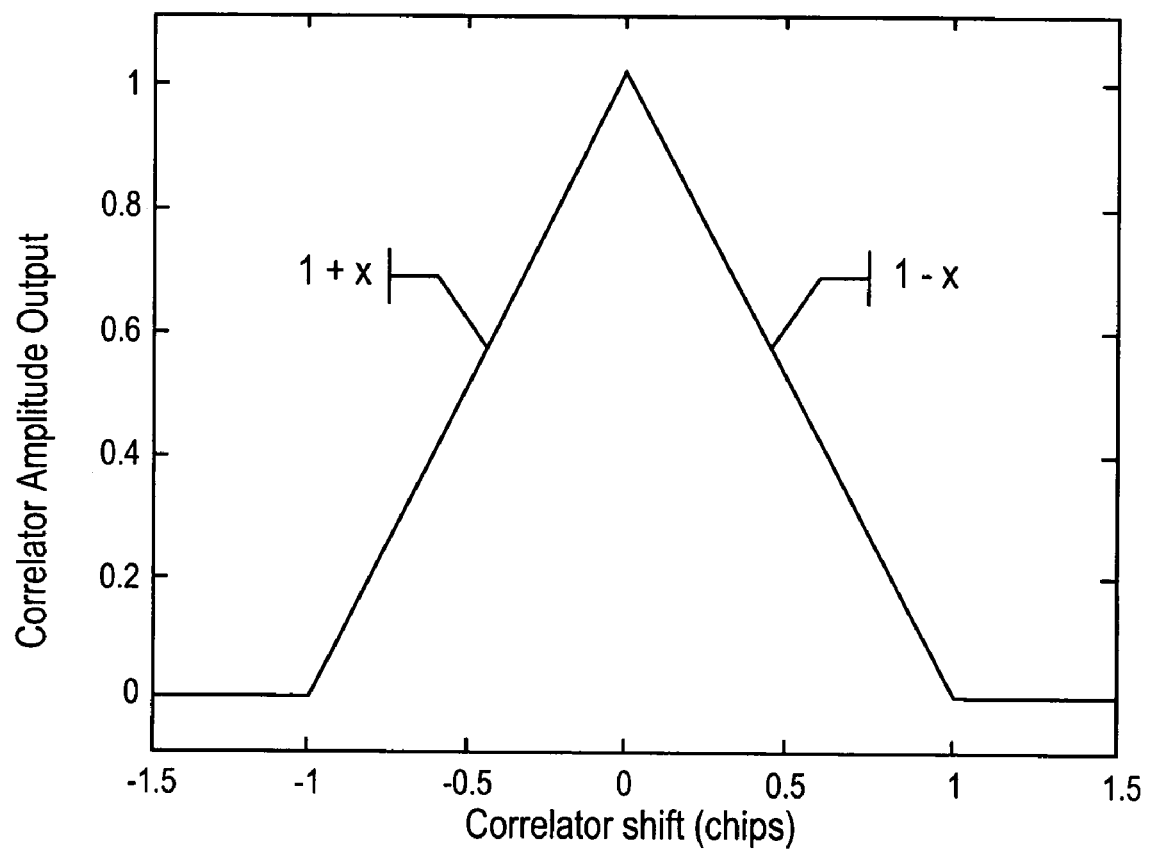
FIG. 3 illustrates an ideal correlator amplitude output.

It is well known that the ideal output of the correlator is a symmetrical triangle function, which is shown in FIG. 3. However, the graph shown in FIG. 3 is the envelope of the voltage signal produced by the correlation process. In order to determine correlator power for use by the discriminator function, the correlator output must be squared. In receivers that use in-phase (I) and quadrature (Q) signals, both components are correlated separately, squared and added together to produce the correlator power. The resulting graph is shown in FIG. 4.

Figure 4:
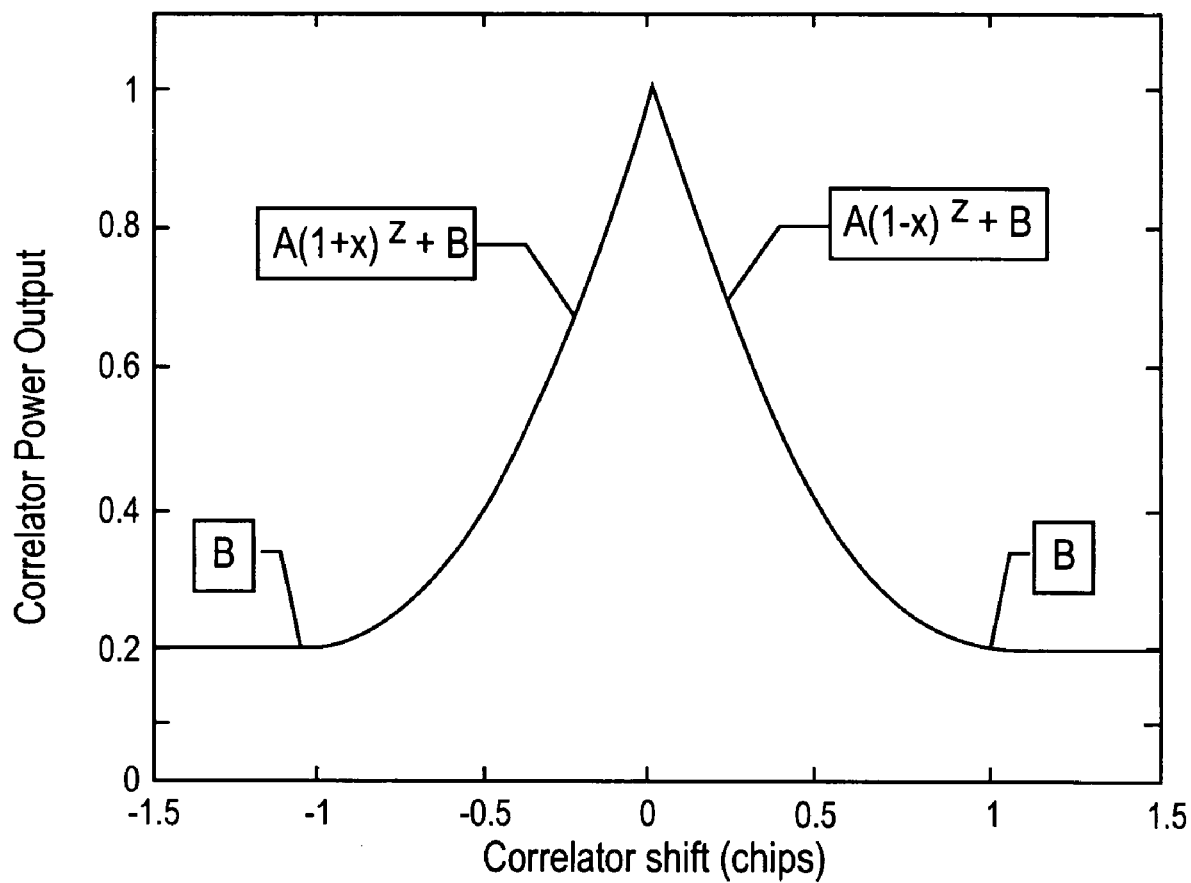
FIG. 4 illustrates an ideal correlator power output.

In the graph of correlator output versus correlator shift shown in FIG. 4, x represents the correlator shift normalized by the width of a single code chip, A represents an overall signal amplitude and B represents and arbitrary additive constant. Letting P(x) represent correlator power as a function of correlator shift x, we have:

$$P(x)=A(1+x)^2+B, \text{ for } -1<x<0$$

$$P(x)=A(1-x)^2+B, \text{ for } 0<x<1.$$

For the case of ½ chip spacing between the early and prompt and between the prompt and late correlators, and the correct alignment of the prompt correlator, we have:

$$Pe=P(-½)=A(1-½)^2+B=A/4+B;$$

$$Pp=P(0)=A+B; \text{ and}$$

$$Pl=P(½)=A(1-½)^2+B=A/4+B.$$

Now assume that the received signal and the prompt local code are misaligned by an amount "d." In this case, the early, prompt and late correlator powers are:

$$Pe=P(-½+d)=A(1+(-½+d))^2+B=A(½+d)^2+B;$$

$$Pp=P(d)=A(1-|d|)^2+B; \text{ and}$$

$$Pl=P(½+d)=A(1-(½+d))^2+B=A(½-d)^2+B.$$

It is noted that the above equations can be combined in order to solve for the misalignment value "d." In particular, "d" can be expressed according to the equations $$d=(Pe-Pl)/(\tfrac{4}{3}(Pe-Pp)-4(Pl-Pp)), \text{ where } 0<=d<=1;$$
and $$d=(Pe-Pl)/(\tfrac{4}{3}(Pl-Pp)-4(Pe-Pp)), \text{ where } -1<=d<=0.$$

In order to select which expression to use for "d," the relative values of Pe and Pl are considered. Thus, if Pe>Pl, then the expression for 0<=d<=1 is used. Likewise, if Pe<Pl, then the expression for -1<=d<=0 is used.

This quantity d can now be used as the definition of a discriminator function to be used in the delay lock loop. Note that while the numerator in d depends on the difference between the early and late correlator powers just as before, the denominator now involves the prompt correlator power as well. A plot of this discriminator function d versus misalignment x is shown in the curve in FIG. 7. Unlike the discriminator behavior shown in FIG. 6, discriminators of various embodiments exhibit linear behavior with a slope of 1 over the entire range from −½ chip to +½ chip. An example of the performance of such a discriminator is shown in FIG. 7. It also achieves greater extreme values than the discriminator shown in FIG. 6, thereby providing better pull-in performance. This improved performance is a direct result of the altered form of the denominator contained in this definition of the discriminator.

Alternatively, in other embodiments, the discriminator function may accommodate chip spacings other than +/−½. For example, for an arbitrary chip spacing Δ, the discriminator function of code discriminator 210 may be expressed as follows:

$$d=\Delta(1-\Delta/2)(Pe-Pl)/(\Delta(Pe-Pp)-(2-\Delta)(Pl-Pp)) \text{ for } Pe>Pl; \text{ and}$$

$$d=\Delta(1-\Delta/2)(Pe-Pl)/(\Delta(Pl-Pp)-(2-\Delta)(Pe-Pp)) \text{ for } Pe<Pl,$$

where Δ may be any arbitrary chip spacing, such as ½ or ¹⁄₂₀.

Of note, the above discriminator function still exhibits the desired slope of 1 at the zero crossing and is perfectly linear across the interval (−Δ, Δ).

Figure 5:
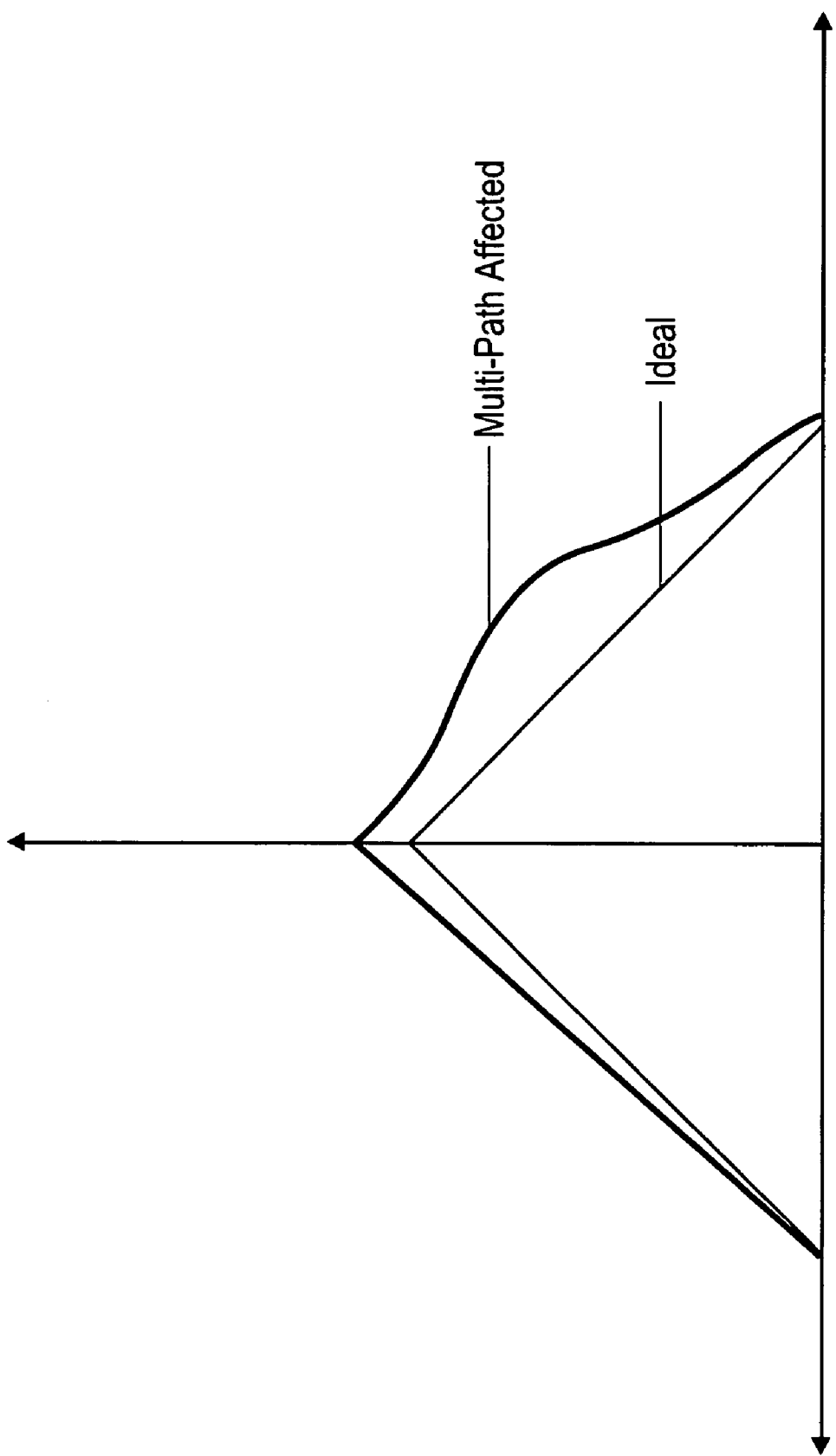
FIG. 5 illustrates an ideal correlator output along with a correlator output that has been affected by multipath signals.

Accordingly, various embodiments of code discriminator 210 may employ unequal spacings between the correlators. For example, the early and prompt correlators may be spaced by ½ a chip, while the prompt and late correlators may be spaced by ¼ of a chip. The use of unequal spacings may be advantageous in order to deal with multipath signals that are adversely affecting the shape of the correlator function. An example of the effect of multipath signals on the correlator function is shown with reference to FIG. 5. Since multipath signals tend to arrive later than the direct path signals, the late correlator power may be more affected by multipath signals. Thus, code discriminator 210 may employ a smaller spacing between the prompt and late correlators to reduce the impact of multipath signals.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of aligning a local code with a code in a received signal, said method comprising:

generating a prompt replica of the local code;

generating a late replica of the local code and an early replica of the local code based on shifting the prompt replica by half of a chip at most;

correlating the early, prompt, and late replicas of the local code with the received signal;

determining an early correlator power, a prompt correlator power, and a late correlator power based on the correlations of the replicas of the local code with the received signal;

calculating a discrimination output based on comparing the early correlator power and the late correlator power and normalizing the comparison based on the early correlator power, the late correlator power, and the prompt correlator power;

determining if the early correlator power is greater than the late correlator power;

calculating the discrimination output based on a quotient, when the early correlator power is greater than the late correlator power, wherein a numerator of the quotient is based on a difference between the early correlator power and the late correlator power and a denominator of the quotient is based on a first factor times a difference between the early correlator power and the prompt correlator power and a second factor times a difference between the late correlator power and the prompt correlator power; and adjusting a rate of the local code based on the discrimination output.

2. The method of claim 1, wherein calculating the discrimination output based on the early correlator power, the prompt correlator power, and the late correlator power at correlator spacings of ½ chip comprises:

calculating the discrimination output based on the quotient, when the early correlator power is greater than the late correlator power, wherein the numerator of the quotient is equal to the difference between the early correlator power and the late correlator power and the denominator of the quotient is equal to ⁴⁄₃ times the difference between the early correlator power and the prompt correlator power minus four times the difference between the late correlator power and the prompt correlator power.

3. The method of claim 1, wherein calculating the discrimination output based on the early correlator power, the prompt correlator power, and the late correlator power at correlator spacings of ¹⁄₂₀ chip comprises:

calculating the discrimination output based on the quotient, when the early correlator power is greater than the late correlator power, wherein the numerator of the quotient is equal to two times the difference between the early correlator power and the late correlator power and the denominator of the quotient is equal to ⁴⁰⁄₃₉ times the difference between the early correlator power and the prompt correlator power minus 40 times the difference between the late correlator power and the prompt correlator power.

4. A method of aligning a local code with a code in a received signal, said method comprising:

generating a prompt replica of the local code;

generating a late replica of the local code and an early replica of the local code based on shifting the prompt replica by half of a chip at most;

correlating the early, prompt, and late replicas of the local code with the received signal;

determining an early correlator power, a prompt correlator power, and a late correlator power based on the correlations of the replicas of the local code with the received signal;

calculating a discrimination output based on comparing the early correlator power and the late correlator power and normalizing the comparison based on the early correlator power, the late correlator power, and the prompt correlator power;

determining if the early correlator power is less than the late correlator power;

calculating the discrimination output based on a quotient, when the early correlator power is less than the late correlator power, wherein a numerator of the quotient is based on a difference between the early correlator power and the late correlator power and a denominator of the quotient is based on a first factor times a difference between the late correlator power and the prompt correlator power and a second factor times a difference between the early correlator power and the prompt correlator power; and adjusting a rate of the local code based on the discrimination output.

5. The method of claim 4, wherein calculating the discrimination output based on the early correlator power, the prompt correlator power, and the late correlator power at correlator spacings of ½ chip comprises:

calculating the discrimination output based on the quotient, when the early correlator power is less than the late correlator power, wherein the numerator of the quotient is equal to the difference between the early correlator power and the late correlator power and the denominator of the quotient is equal to $4/3$ times the difference between the late correlator power and the prompt correlator power minus four times the difference between the early correlator power and the prompt correlator power.

6. The method of claim 4, wherein calculating the discrimination output based on the early correlator power, the prompt correlator power, and the late correlator power at correlator spacings of 1/20 chip comprises:

calculating the discrimination output based on the quotient, when the early correlator power is less than the late correlator power, wherein the numerator of the quotient is equal to two times the difference between the early correlator power and the late correlator power and the denominator of the quotient is equal to $40/39$ times the difference between the late correlator power and the prompt correlator power minus 40 times the difference between the early correlator power and the prompt correlator power.

7. An apparatus for aligning a local code with a code in a received signal, said apparatus comprising:

means for generating a prompt replica of the local code;

means for generating a late replica of the local code and an early replica of the local code based on shifting the prompt replica by half of a chip at most; means for correlating the early, prompt, and late replicas of the local code with the received signal;

means for determining an early correlator power, a prompt correlator power, and a late correlator power based on the correlations of the replicas of the local code with the received signal;

means for calculating a discrimination output based on comparing the early correlator power and the late correlator power and normalizing the comparison based on the early correlator power, the late correlator power, and the prompt correlator power;

means for determining if the early correlator power is greater than the late correlator power;

means for calculating the discrimination output based on a quotient, when the early correlator power is greater than the late correlator power, wherein a numerator of the quotient is based on a difference between the early correlator power and the late correlator power and a denominator of the quotient is based on a first factor times a difference between the early correlator power and the prompt correlator power and a second factor times a difference between the late correlator power and the prompt correlator power; and means for adjusting a rate of the local code based on the discrimination output.

8. The apparatus of claim 7, wherein the means for generating the prompt replica of the local code comprises means for generating the prompt replica of a pseudo-random noise code.

9. The apparatus of claim 7, wherein the means for generating the prompt replica of the local code comprises means for generating the prompt replica of a clear/acquisition code used by a global positioning satellite.

10. The apparatus of claim 7, wherein the means for calculating the discrimination output based on the early correlator power, the prompt correlator power, and the late correlator power when the correlator spacing is ½ chip comprises:

means for calculating the discrimination output based on the quotient, when the early correlator power is greater than the late correlator power, wherein the numerator of the quotient is equal to the difference between the early correlator power and the late correlator power and the denominator of the quotient is equal to $4/3$ times the difference between the early correlator power and the prompt correlator power minus four times the difference between the late correlator power and the prompt correlator power.

11. An apparatus for aligning a local code with a code in a received signal, said apparatus comprising:

means for generating a prompt replica of the local code;

means for generating a late replica of the local code and an early replica of the local code based on shifting the prompt replica by half of a chip at most;

means for correlating the early, prompt, and late replicas of the local code with the received signal;

means for determining an early correlator power, a prompt correlator power, and a late correlator power based on the correlations of the replicas of the local code with the received signal;

means for calculating a discrimination output based on comparing the early correlator power and the late correlator power and normalizing the comparison based on the early correlator power, the late correlator power, and the prompt correlator power;

wherein the means for calculating the discrimination output based on the early correlator power, the prompt correlator power, and the late correlator power comprises:

means for determining if the early correlator power is less than the late correlator power; and means for calculating the discrimination output based on a quotient, when the early correlator power is less than the late correlator power, wherein a numerator of the quotient is based on a difference between the early correlator power and the late correlator power and a denominator of the quotient is based on a first factor times a difference between the late correlator power and the prompt correlator power and a second factor times a difference between the early correlator power and the prompt correlator power; and means for adjusting a rate of the local code based on the discrimination output.

12. The apparatus of claim 11, wherein the means for calculating the discrimination output based on the early correlator power, the prompt correlator power, and the late correlator power for correlator spacings of ½ chip comprises:

means for calculating the discrimination output based on the quotient, when the early correlator power is less than the late correlator power, wherein the numerator of the quotient is equal to two the difference between the early correlator power and the late correlator power and the denominator of the quotient is equal to $4/3$ times the difference between the late correlator power and the prompt correlator power minus four times the difference between the early correlator power and the prompt correlator power.

13. A delay lock loop configured to track a pseudo random noise code in a received signal, said delay lock loop comprising:

a code generator that generates a prompt replica of the local code, a late replica of the local code and an early replica of the local code based on shifting the prompt replica by half of a chip at most;

a demodulator configured to correlate the early, prompt, and late replicas of the local code with the received signal;

a processor configured to calculate an early correlator power, a prompt correlator power, and a late correlator power based on the correlations of the replicas of the local code with the received signal;

a code discriminator configured to calculate a discrimination output based on comparing the early correlator power and the late correlator power and normalizing the comparison based on a quotient, when the early correlator power is greater than the late correlator power, wherein a numerator of the quotient is based on a difference between the early correlator power and the late correlator power and a denominator of the quotient is based on a first factor times a difference between the early correlator power and the prompt correlator power and a second factor times a difference between the late correlator power and the prompt correlator power; and a feedback module configured to provide a signal that indicates an adjustment to a rate of the local code generated by the code generator based on the discrimination output.

14. The delay lock loop of claim 13, wherein the code generator is configured to generate the early, prompt, and late code replicas based on an even spacing of at most ½ of a chip.

15. The delay lock loop of claim 13, wherein the code generator is configured to generate the early, prompt, and late code replicas based on an unequal spacing.

16. The delay lock loop of claim 13, wherein the code generator is configured to generate the early code replica based on a spacing from the prompt code replica that is greater than a spacing from the prompt code replica to the late code replica.

17. A delay lock loop configured to track a pseudo random noise code in a received signal, said delay lock loop comprising:

a code generator that generates a prompt replica of the local code, a late replica of the local code and an early replica of the local code based on shifting the prompt replica by half of a chip at most;

a demodulator configured to correlate the early, prompt, and late replicas of the local code with the received signal;

a processor configured to calculate an early correlator power, a prompt correlator power, and a late correlator power based on the correlations of the replicas of the local code with the received signal;

a code discriminator configured to calculate a discrimination output based on comparing the early correlator power and the late correlator power and normalizing the comparison based on a quotient, when the early correlator power is less than the late correlator power, wherein a numerator of the quotient is based on a difference between the early correlator power and the late correlator power and a denominator of the quotient is based on a first factor times a difference between the late correlator power and the prompt correlator power and a second factor times a difference between the early correlator power and the prompt correlator power; and a feedback module configured to provide a signal that indicates an adjustment to a rate of the local code generated by the code generator based on the discrimination output.

18. The delay lock loop of claim 17, wherein the code generator is configured to generate the early code replica based on a spacing from the prompt code replica that is greater than a spacing from the prompt code replica to the late code replica.

* * * * *